Jan. 20, 1953　　　E. W. HOLMES, JR　　　2,625,837
STEERING WHEEL CLAMP FOR AUTOMOBILES
Filed April 20, 1950　　　2 SHEETS—SHEET 1
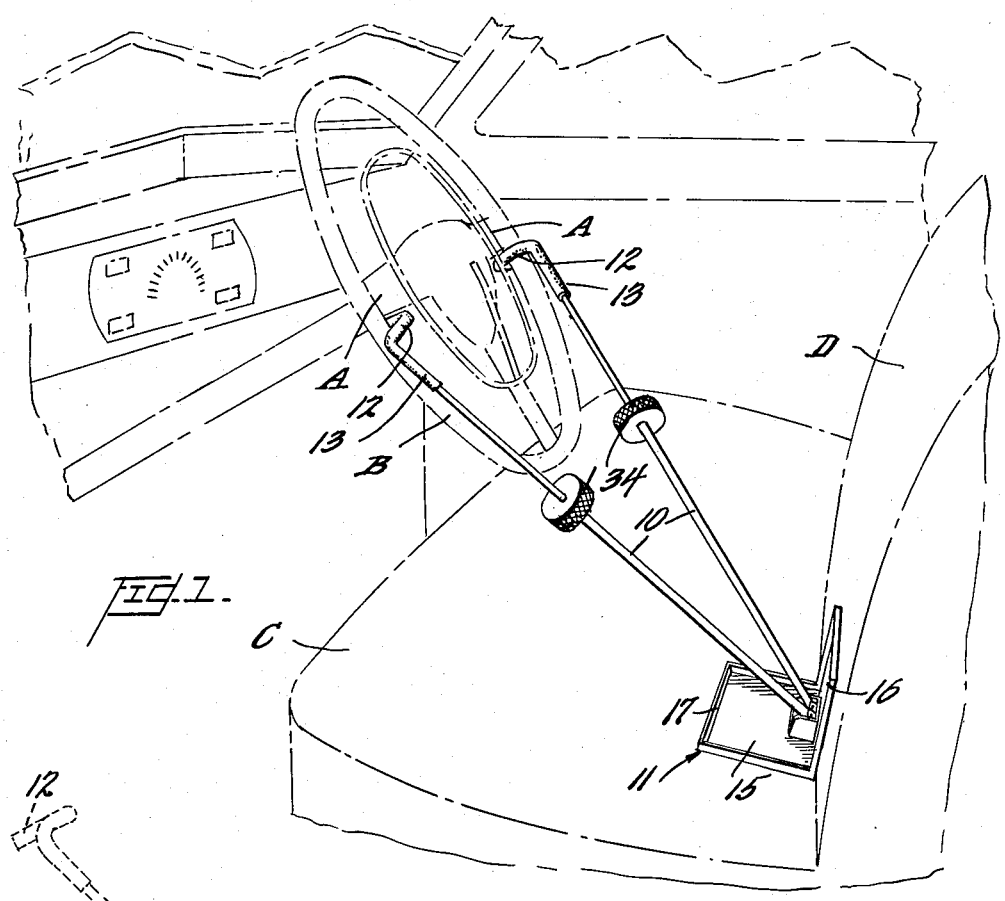
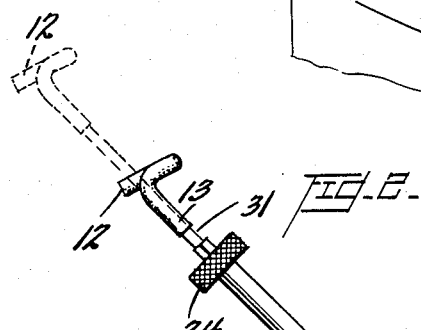
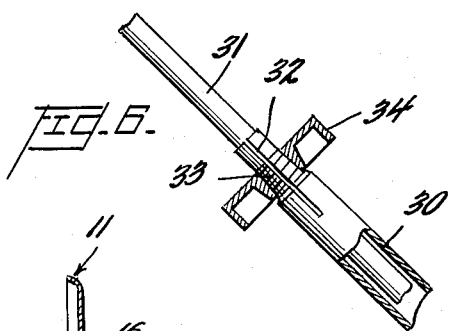
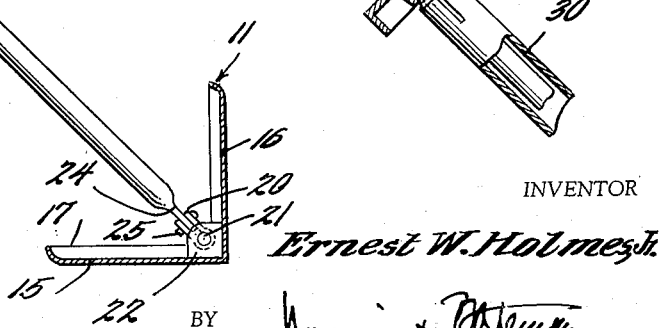
INVENTOR
*Ernest W. Holmes Jr.*
BY
ATTORNEYS

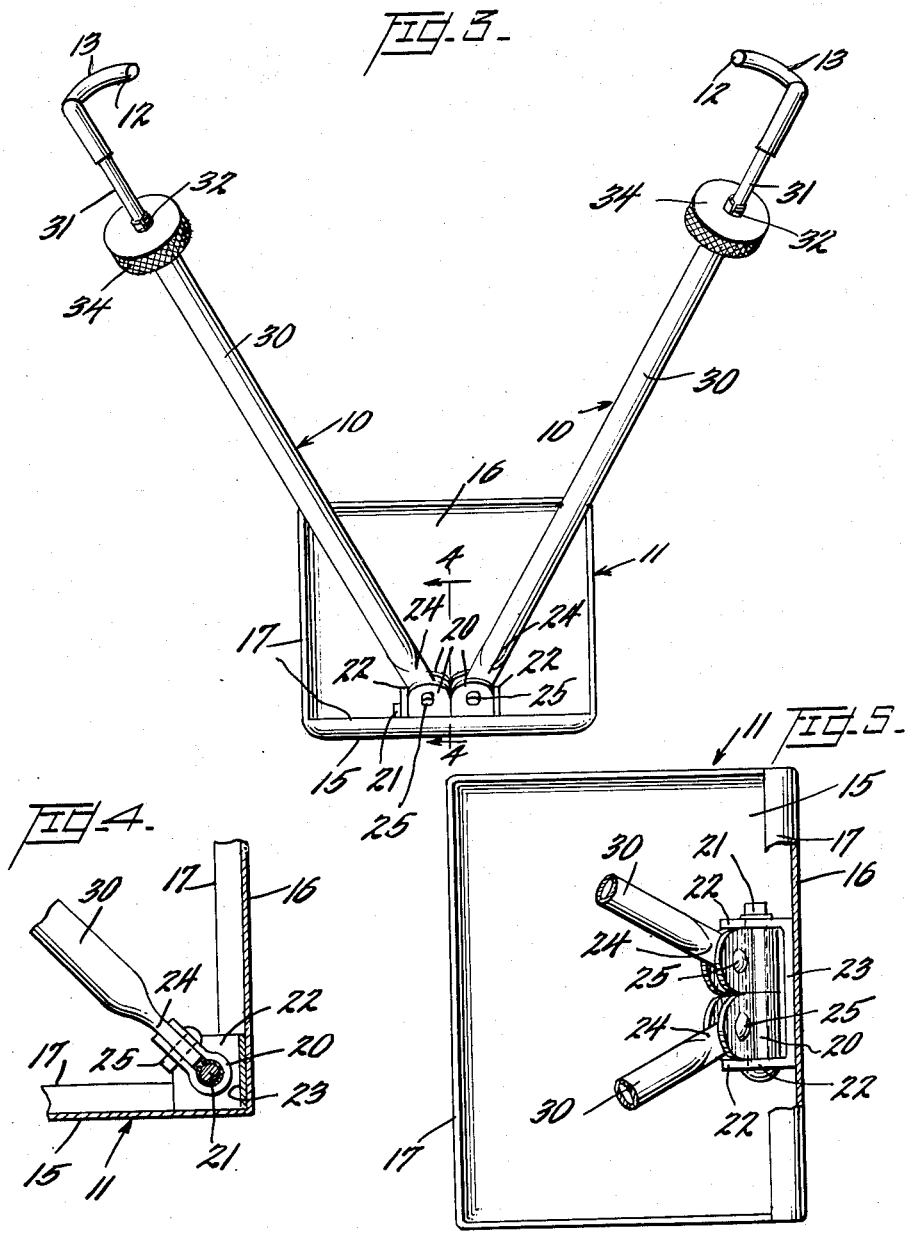

UNITED STATES PATENT OFFICE 2,625,837

STEERING WHEEL CLAMP FOR AUTOMOBILES

Ernest W. Holmes, Jr., Chattanooga, Tenn., assignor to Ernest Holmes Company, a corporation of Tennessee Application April 20, 1950, Serial No. 157,087

12 Claims. (Cl. 74—495)

The present invention relates to a clamp or lock for the steering wheels of automobiles, trucks and other automotive vehicles for holding the front wheels thereof in proper steering position, as during towing of a disabled vehicle while suspended at its rear end by a towing truck or wrecker.

A primary object of the invention is to provide a novel and improved device of this character which can be applied quickly and with facility to the steering wheel to be clamped or locked.

Another object is to provide a device of this character which is applicable universally to the steering wheels of various automobiles, trucks or other automotive vehicles, the device being adjustable to accommodate it to steering wheels of different dimensions or other structural characteristics and located in different positions in the different vehicles.

A further object of the invention is to provide a steering wheel clamp or lock which may be applied conveniently to the steering wheel and anchored in the vehicle without requiring the use of tools.

To these and other ends, the invention consists in certain improvements, and combinations and arrangement of parts, all of which will be hereinafter described in detail, the features of novelty being pointed out more particularly in the claims at the end of this specification.

The preferred embodiment of the invention is shown in the accompanying drawings and will be herein described with reference thereto, wherein Fig. 1 is a perspective view showing the improved steering wheel clamp applied to the steering wheel of an automobile.

Fig. 2 is a vertical section of the clamp, indicating by dotted lines adjustment of the length of one of the arms.

Fig. 3 is an elevation of the clamp as viewed from the front in substantially the position it occupies when applied to the steering wheel of an automobile.

Fig. 4 is a detail vertical section, taken on the line 4—4 in Fig. 3.

Fig. 5 is a top plan view, on an enlarged scale, of the anchor member and portions of the steering wheel engaging arms.

Fig. 6 is a detail section showing means for securing the members of one of the steering wheel engaging arms in longitudinally adjusted relation.

Similar parts are designated by the same reference characters in the different figures.

The improved steering wheel clamp, as shown in the present instance, comprises a pair of arms 10 and an anchor member 11 to which the arms are connected. Each of the arms is provided at one end with means for engaging a peripheral portion of the steering wheel, such as a portion thereof where a spoke A of the wheel joins the rim B thereof and which forms a crotch. For this purpose, one end of each of the arms is bent to form a hook 12 which is preferably covered by a sleeve 13 of plastic or other suitable material to prevent marking or damage to the steering wheel. The hooks on the arms are turned in relatively opposite directions, preferably inwardly from the arms as shown so that the adjacent portions of the arms and the hooks may rest on the rim of the wheel and the hooks placed around the inner side of the rim and engaged with spokes of the wheel at the under sides and adjacent to their junctions with the rim.

The anchor member 11 to which the rear ends of the arms 10 are connected is adapted to be placed on the seat C and against the seat back D behind the steering wheel of the automobile and thus provide means for preventing turning of the arms attached to the steering wheel. This anchor member comprises preferably a rigid metal plate bent into right-angular relation to form a bottom seat engaging portion 15 and an upright seat back engaging portion 16, these portions being surrounded by a flange 17 which serves to stiffen them and to prevent cutting of the material composing the seat and seat back.

In order to enable the clamp to be applied to steering wheels of different diameters and at different distances from the seat back of the vehicle, and also steering wheels located at different heights relatively to the seat, the rear ends of the arms are connected to the anchor member 11 by universal joints. Each of the joints, as shown in the present instance, comprises a clevis 20 mounted pivotally on a horizontal pin 21 which extends through the angularly bent ends 22 of a yoke 23 which is welded or otherwise suitably secured to the anchor member at the junction of its bottom and upwardly extending portions 15 and 16 respectively, the clevises for both arms being preferably accommodated between the ends 22 of the yoke. The ends of each clevis are spaced apart to receive between them the rear end of the respective arm, which is preferably flattened as shown at 24, and these parts are pivotally connected by a pivot pin 25 the axis of which is at a right angle to the axis of the pivot pin 21. By this construction, each of the arms 10 is so connected to the anchor member 11 that it may swing laterally about the pivot pin 25 and upwardly and downwardly about the pivot pin 21.

Since the distance between the steering wheel and the seat back usually varies in different automobiles or other motive vehicles, and the steering wheels thereof contain different numbers of spokes, the arms 10 are made adjustable in length to compensate therefor. Preferably and as shown in the present instance, each of these arms is composed of an outer tubular member 30 the lower rear end of which is pivotally connected to the anchor member in the manner hereinbefore described, and an inner member 31 which carries the hook 12 and is preferably composed of a round rigid rod which is slidable axially within the outer member to vary the length of the respective arm. Suitable means is provided for securing the inner member 31 in different adjusted positions longitudinally and radially of the outer member 30, such means preferably being provided by slotting the upper end of the outer member 30 longitudinally, as indicated at 32, and providing this end of this member with a tapered screw thread 33, and threading thereon a nut 34 which is provided with a corresponding tapered screw thread. By this construction, rotation of the nut 34 to unscrew it from the threaded end of the member 30 will permit the slotted end thereof to expand and assume its normal diameter and permit the member 31 to slide longitudinally therein for longitudinal adjustment in the member 30, and rotation of the nut in the opposite direction will cause the tapered threads between the nut and the slotted end of the member 30 to contract said slotted end, thereby clamping the member 31 immovably therein. The nut 34 is preferably knurled, as shown, to enable it to be rotated by hand without requiring the use of a wrench.

In applying the improved clamp to the steering wheel of an automobile or other automotive vehicle which is to be towed, the steering wheel is turned to a position where the front wheels of the automobile are set to steer a straight course so that the towed automobile will follow in alinement the towing vehicle, the anchor member 11 is placed on the rear portion of the automobile seat C and against the adjacent portion of the seat back D directly behind the steering wheel, and the hooks 12 on the arms 10 are placed on the rim B of the steering wheel to extend around the inner sides thereof and against spokes A at the opposite sides of the steering wheel. While the nuts 34 are loosened, and the parts are in the positions just described, the members 31 of the arms are forced upwardly against the spokes of the steering wheel and the anchor member 11 is pressed down and back against the seat and seat back and the nuts 34 are then tightened, thereby clamping the members 31 in extended positions while the anchor member is firmly held from movement by its engagement with the seat and seat back. The arms clutched to the steering wheel and anchored by the anchor member will thus prevent turning of the steering wheel. To remove the device after use, it is only necessary to loosen the nuts 34 and retract and disengage the hooks from the steering wheel, and to lift the anchor member from the seat.

Although the spokes of the steering wheel may be at different heights when the steering wheel occupies a position for straight steering of the automobile, such will be compensated for by extending the members 31 to the appropriate extents to bring the hooks thereon into engagement with the respective spokes, these members of the arms being individually adjustable in length. The individual adjustment for the lengths of the arms also enables it to be applied to steering wheels with various numbers of spokes, and it enables the clamp to be applied to steering wheels of different diameters and to steering wheels located at different heights and different distances from the seat of the automobile or other vehicle.

As the arms occupy a divergent relation while engaged with the steering wheel, they will retain their engagement with the steering wheel under forces applied to the steering wheel tending to turn it, since such turning force will be sustained by engagement of the hooks with the inner side of the rim of the wheel.

I claim:

1. A steering wheel clamp for automotive vehicles, comprising an anchor member shaped to engage a portion of the vehicle to hold it from movement, and a pair of arms having universal joint connections at one end to said member for adjustment into different inclinations and different laterally divergent relations and having portions at their other ends engageable respectively with the rim and spokes at opposite sides of the steering wheel, said arms being adjustable in length and having means for securing them in fixed adjusted lengths.

2. A steering wheel clamp for automotive vehicles, comprising a pair of extensible arms both having means at one end engageable with the rim and spokes of the steering wheel, an anchor member adapted for support against a portion of the vehicle, universal joints connecting the other ends of the arms to the anchor member, and means for securing the arms in fixed adjusted lengths.

3. A steering wheel clamp for an automotive vehicle having a seat, comprising an anchor member having a substantially flat plate to rest on the seat of the vehicle, and arms adjustable in length and pivotally connected to said member for adjustment into divergent relation and having means at their divergent ends for engagement respectively with the rim and spokes of the steering wheel at different sides of its center, and means for securing the arms in fixed adjusted lengths.

4. A steering wheel clamp for an automotive vehicle having a seat and a seat back, in angular relation thereto, comprising an anchor member having relatively angular portions for engagement and support at the junction of the seat and seat back of the vehicle, and arms connected to said member and adjustable in length and into divergent relation and having means at their ends for engagement respectively with peripheral portions of the steering wheel at different sides of its center, and means for securing said arms in fixed adjusted lengths.

5. A steering wheel clamp as defined in claim 4, wherein said means comprise hooks engageable with spokes and adjacent portions of the rim of the steering wheel.

6. A steering wheel clamp for an automotive vehicle having a seat and a seat back, in angular relation thereto, comprising an anchor member in the form of a plate bent into angular shape to fit respectively against the rear portion of the seat and the adjacent portion of the seat back of the vehicle, and a pair of arms connected to the anchor member and adjustable into divergent relation, and having portions on their divergent ends engageable respectively with the steering wheel at different sides of its center, said arms being adjustable in length and provided with means for securing them in different fixed adjusted lengths.

7. A steering wheel clamp for an automotive vehicle having a seat and a seat back, in angular relation thereto, comprising an anchor member having substantially flat portions extending in angular relation for engagement and support at the junction of the seat and seat back of the vehicle, and a pair of arms each comprising a pair of telescopic members one of which is pivotally connected to said anchor member and adjustable into divergent relation and at different inclinations relatively to said anchor member, and the other members of said arms having portions on their divergent ends engageable respectively with the steering wheel at different sides of its center, and means on each arm for securing the members thereof in fixed longitudinal relation.

8. A steering wheel clamp for a automotive vehicle having a substantially horizontal seat and a seat back extending upwardly therefrom, comprising an anchor member having portions extending in substantially right-angular relation for engagement respectively with the seat and seat back of the vehicle, and a pair of arms connected to the anchor member to extend therefrom in divergent relation, said arms being adjustable in length and having means for securing them in fixed adjusted lengths, and having portions on the ends thereof engageable respectively with different portions of the periphery of the steering wheel.

9. A steering wheel clamp for an automotive vehicle having a seat and a seat back extending upwardly therefrom, comprising an anchor member having portions extending in substantially right-angular relation for engagement respectively with adjacent portions of the seat and seat back of the vehicle, and a pair of arms adjustable in length and having means for securing them in fixed adjusted lengths, said arms having universal connections with the anchor member to extend upwardly therefrom at an inclination and in divergent relation for engagement of their divergent ends respectively with portions of the steering wheel at different sides of its center.

10. A steering wheel clamp for automotive vehicles, comprising a pair of arms, and an anchor member to which said arms at one end are pivotally connected for adjustment into divergent relation to conform with the diameter of the steering wheel, the other ends of the arms having portions which are turned toward one another to extend over the rim of the steering wheel and the extremities of said portions being bent angularly thereto to abut respectively against spokes of the steering wheel, said arms being individually adjustable in length to position said angularly bent portions for abutting engagement respectively with spokes of the steering wheel, and having means for securing them in fixed adjusted lengths.

11. A steering wheel clamp for an automotive vehicle having a substantially horizontal seat and a seat back extending upwardly therefrom, comprising an anchor member having substantially flat portions extending in angular relation for engagement respectively with the seat and seat back, and a pair of arms connected to said anchor member and adjustable into different divergent relations and at different inclinations relatively to said anchor member, said arms having portions on their divergent ends engageable respectively with the steering wheel at different sides of its center, and each of said arms comprising members one of which is tubular and has a contractable portion engageable with the other member of the arm, and means for contracting said contractable portion to secure the other member of the arm therein.

12. A steering wheel clamp for an automotive vehicle having a substantially horizontal seat and a seat back extending upwardly therefrom, comprising an anchor member having substantially flat portions extending in angular relation for engagement respectively with the seat and seat back, and a pair of arms pivotally connected to said anchor member for adjustment into different divergent relation and at different inclinations relatively to said anchor member, said arms having portions engageable with the steering wheel respectively at opposite sides of its center, and each of said arms comprising members one of which is tubular and has a split portion at its divergent end provided externally with a tapered screw thread, and a nut having a complemental thread therein operable on said split portion to contract it and thereby fix the other member of the arm therein.

ERNEST W. HOLMES, Jr.

REFERENCES CITED

The following references are of record in the file of this patent:

UNITED STATES PATENTS

| Number | Name | Date |
|---|---|---|
| 1,510,957 | Perry | Oct. 7, 1924 |
| 1,804,333 | Gregoire | May 5, 1931 |
| 2,234,623 | Crouse | Mar. 11, 1941 |
| 2,531,675 | Field | Nov. 28, 1950 |